US012612820B2

(12) United States Patent
Guo

(10) Patent No.: US 12,612,820 B2
(45) Date of Patent: Apr. 28, 2026

(54) TYPE OF SLIDING DOOR RAILING

(71) Applicant: Guangzhou Sair Industrial Co.,Ltd, Guangzhou (CN)

(72) Inventor: Jiye Guo, Guangzhou (CN)

(73) Assignee: Guangzhou Sair Industrial Co., Ltd, Guangzhou (CN)

( * ) Notice: Subject to any disclaimer, the term of this patent is extended or adjusted under 35 U.S.C. 154(b) by 0 days.

(21) Appl. No.: 18/806,793

(22) Filed: Aug. 16, 2024

(65) Prior Publication Data

US 2025/0283369 A1 Sep. 11, 2025

(30) Foreign Application Priority Data

Mar. 7, 2024 (CN) ......................... 202420440248.9

(51) Int. Cl.
*E06B 3/50* (2006.01)
*E06B 7/28* (2006.01)

(52) U.S. Cl.
CPC .............. *E06B 3/5054* (2013.01); *E06B 7/28* (2013.01)

(58) Field of Classification Search
CPC ..... E06B 9/04; E06B 9/06; E06B 9/01; E06B 9/02; E06B 2009/002; E06B 3/5054
See application file for complete search history.

(56) References Cited

U.S. PATENT DOCUMENTS

| | | | | | |
|---|---|---|---|---|---|
| 4,677,791 | A * | 7/1987 | Larson | E06B 9/02 49/55 |
| 8,261,490 | B2 * | 9/2012 | Flannery | E05B 65/0007 49/55 |
| 8,713,851 | B2 * | 5/2014 | Flannery | E06B 11/022 49/55 |
| 11,015,386 | B2 * | 5/2021 | Wang | E05B 63/0008 |
| 11,946,315 | B2 * | 4/2024 | Wang | E06B 9/00 |
| 2007/0294944 | A1 * | 12/2007 | Pedersen | E06B 9/04 49/50 |
| 2011/0314738 | A1 * | 12/2011 | Harriott | E06B 9/04 49/50 |

* cited by examiner

*Primary Examiner* — Muhammad Ljaz
*Assistant Examiner* — Susan M. Heschel
(74) *Attorney, Agent, or Firm* — JEEN IP LAW, LLC

(57) ABSTRACT

The present invention discloses a new type of sliding door railing and, during installation, the first connecting mechanism and the second connecting mechanism are spaced in opposite direction fat the installation position, and then the opposite sides of door railing body are detachably and pivotally connected to the first connecting mechanism and second connecting mechanism, respectively, the connection between the door railing body and the first connecting mechanism can be disconnected, and the door railing body can be forced to swing for door opening and closing, with the connection position between the door railing body and the second connecting mechanism as the rotation center; the connection between the door railing body and the second connecting mechanism can also be disconnected.

11 Claims, 7 Drawing Sheets

TYPE OF SLIDING DOOR RAILING

CROSS-REFERENCE TO RELATED APPLICATIONS

This application claims priority to Chinese Patent Application No. 202420440248.9, filed on Mar. 7, 2024, which is hereby incorporated by reference in its entirety.

TECHNICAL FIELD

The present invention relates to the field of door railing technology, in particular to a new type of sliding door railing.

BACKGROUND

In families with infants, in order to protect infants walking out of the room against accidents such as getting lost or personal injury, people often install a sliding door railing in positions like indoor aisles, and the sliding door railing is generally composed of two movably connected door bodies, one of the door bodies can be slid to lengthen or shorten the door railing, and during installation, the length of aisle can be first adjusted according to the length of aisle, and one side of the door railing can be pivotally installed in the installation position, so that the door railing can swing between the position where the aisle is disconnected and the position where the aisle is open and, when the door railing swings to the position where the aisle is disconnected, the other side of the door railing can be locked by the door railing lock. Since the pivot structure on one side is used to swing the door railing and the locking structure on the other side is used to fix the door railing, this type of sliding door railing is a single-side opening door, and the sliding door railings with monotonous structure and operation can hardly arouse consumer attention and interest.

SUMMARY

The main purpose of the present invention is to propose a new type of sliding door railing to address the problems proposed in the background art mentioned above.

To achieve the above purpose, the present invention proposes a new type of sliding door railing, including a door railing body, a first connecting mechanism, and a second connecting mechanism, the first connecting mechanism and the second connecting mechanism are fixed at intervals in opposite in the installation position, and one side of the door railing body is detachably and pivotally connected to the first connecting mechanism, and the side of the door railing body far away from the first connecting mechanism is detachably and pivotally connected to the second connecting mechanism.

The present invention discloses a new type of sliding door railing and, during installation, the first connecting mechanism and the second connecting mechanism are spaced in opposite direction fat the installation position, and then the opposite sides of door railing body are detachably and pivotally connected to the first connecting mechanism and second connecting mechanism, respectively, the connection between the door railing body and the first connecting mechanism can be disconnected, and the door railing body can be forced to swing for door opening and closing, with the connection position between the door railing body and the second connecting mechanism as the rotation center; the connection between the door railing body and the second connecting mechanism can also be disconnected, and the door railing body can be forced to swing for door opening and closing, with the connection position between the door railing body and the first connecting mechanism as the rotation center. Compared with traditional methods, the new type of sliding door railing having a relatively simple structure can be quickly removed when needed, providing ideal practicality and novelty.

DETAILED DESCRIPTION OF THE EMBODIMENTS

The technical solutions in the embodiments of the present invention will be described clearly and completely in conjunction with the accompanying drawings of the embodiments of the present invention. Obviously, the described embodiments are only a part of the embodiments of the present invention, rather than all the embodiments. Based on the embodiments of the present invention, all other embodiments obtained by those of ordinary skill in the art without creative work shall fall within the protection scope of the present invention.

It should be noted that all directional indicators (such as up, down, left, right, front, back, top, bottom, inside, outside, vertical, horizontal, vertical, counterclockwise, clockwise, circumferential, radial, axial . . . ) in the embodiments of the present invention are only used to explain the relative position relationship and movement among various components in a particular posture (as shown in the accompanying drawings), and if that particular posture is changed, the directional indications will change accordingly.

In addition, descriptions involving terms "first," "second" and the like, if any, in the present invention are only for illustrative purposes and cannot be understood as indicating or implying relative importance or the number of features referred to. Therefore, the features defined with "first" and "second" may explicitly or implicitly include at least one or a plurality of the features. At the same time, the technical solutions of various embodiments can be combined with each other, but must be based on what those of ordinary skill in the art can achieve. The combination of technical solutions that result in contradiction or make it impossible to implement should be considered non-existent, and accordingly should not fall within the scope of protection required by this present invention.

The present invention proposes a new type of sliding door railing.

Figure 1:
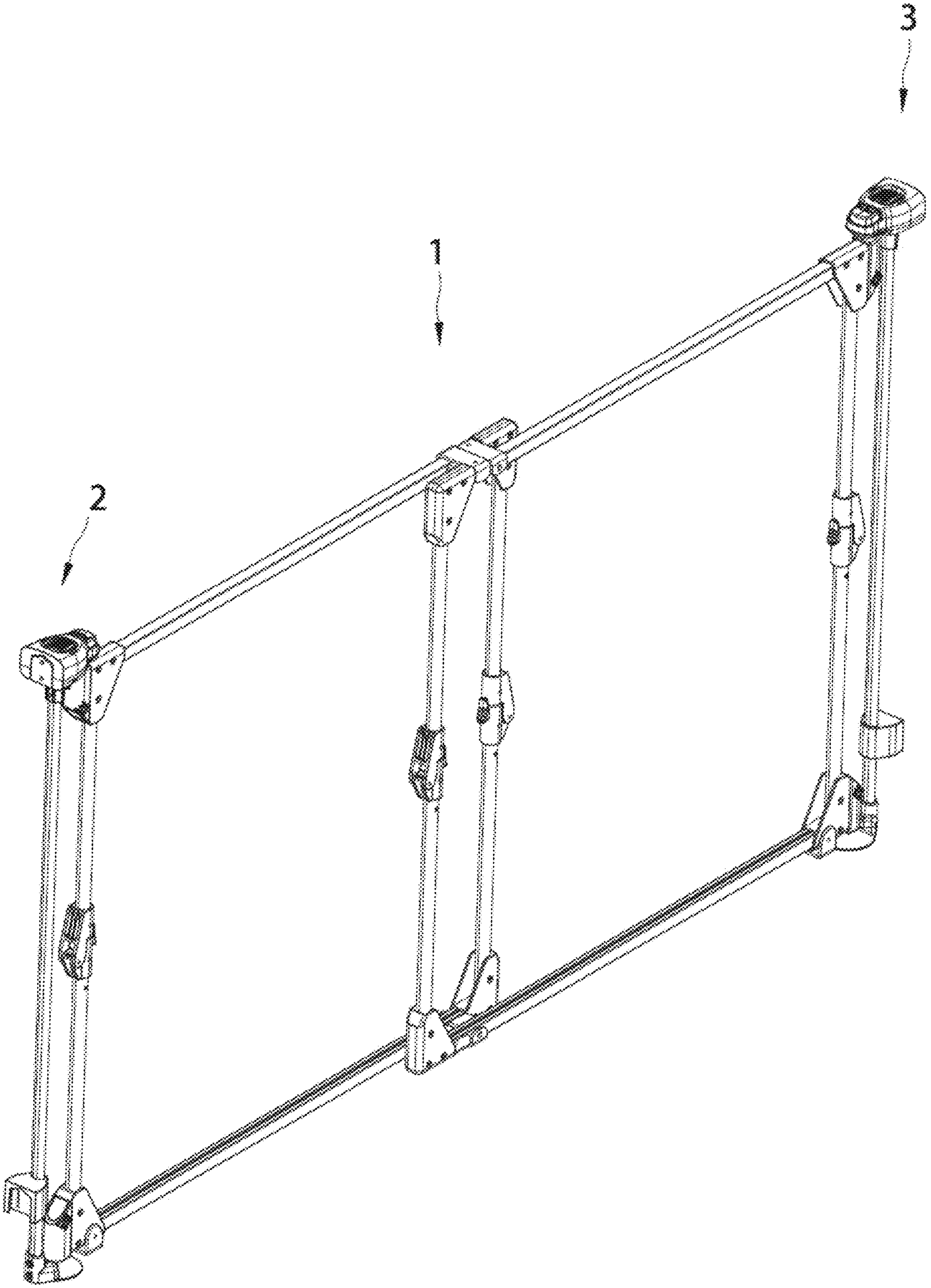
FIG. 1 is a 3D view of the door railing body, first connecting mechanism, and second connecting mechanism during assembly.
Figure 2:
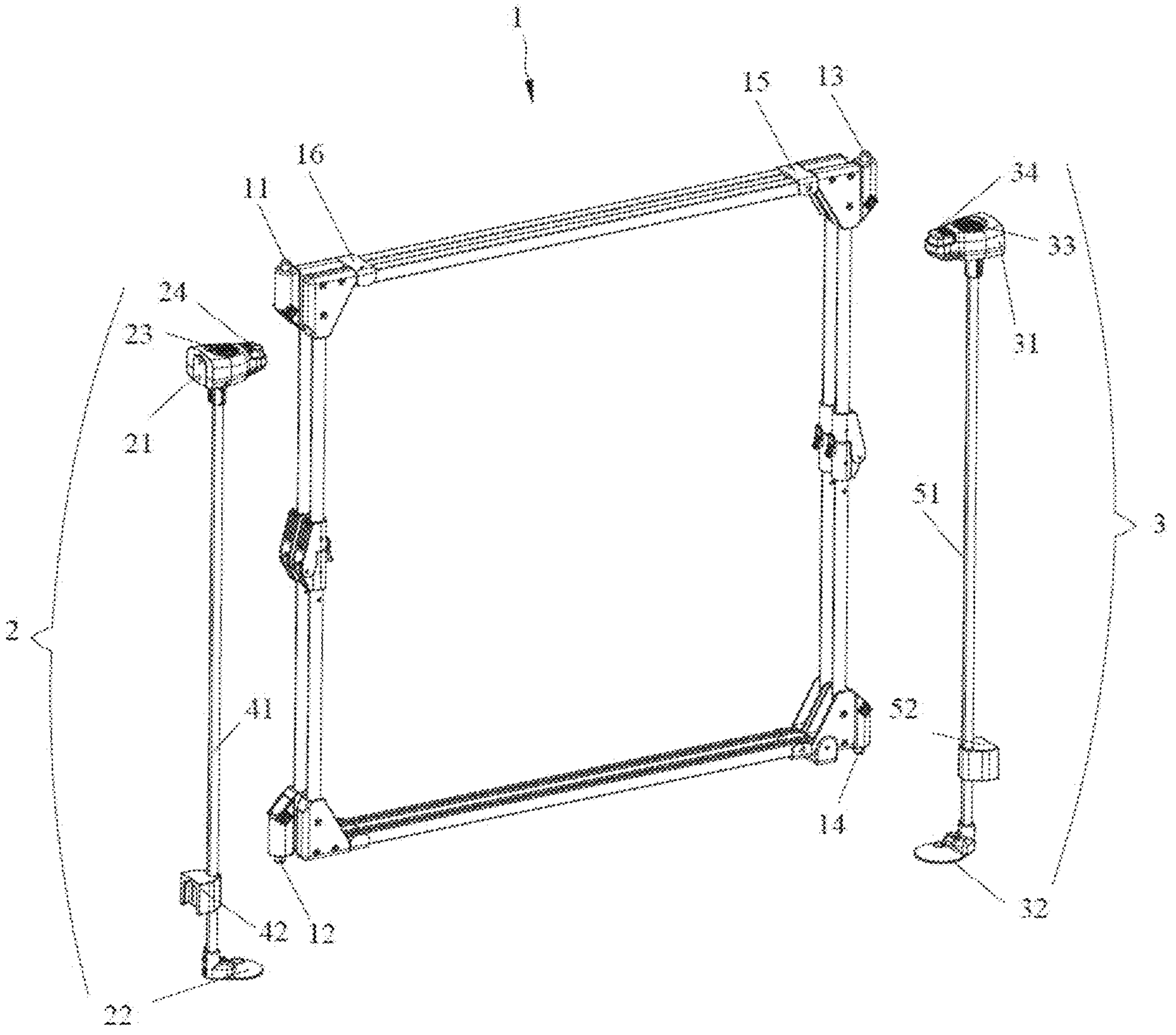
FIG. 2 is a 3D view of the door railing body, first connecting mechanism, and second connecting mechanism.
Figure 3:
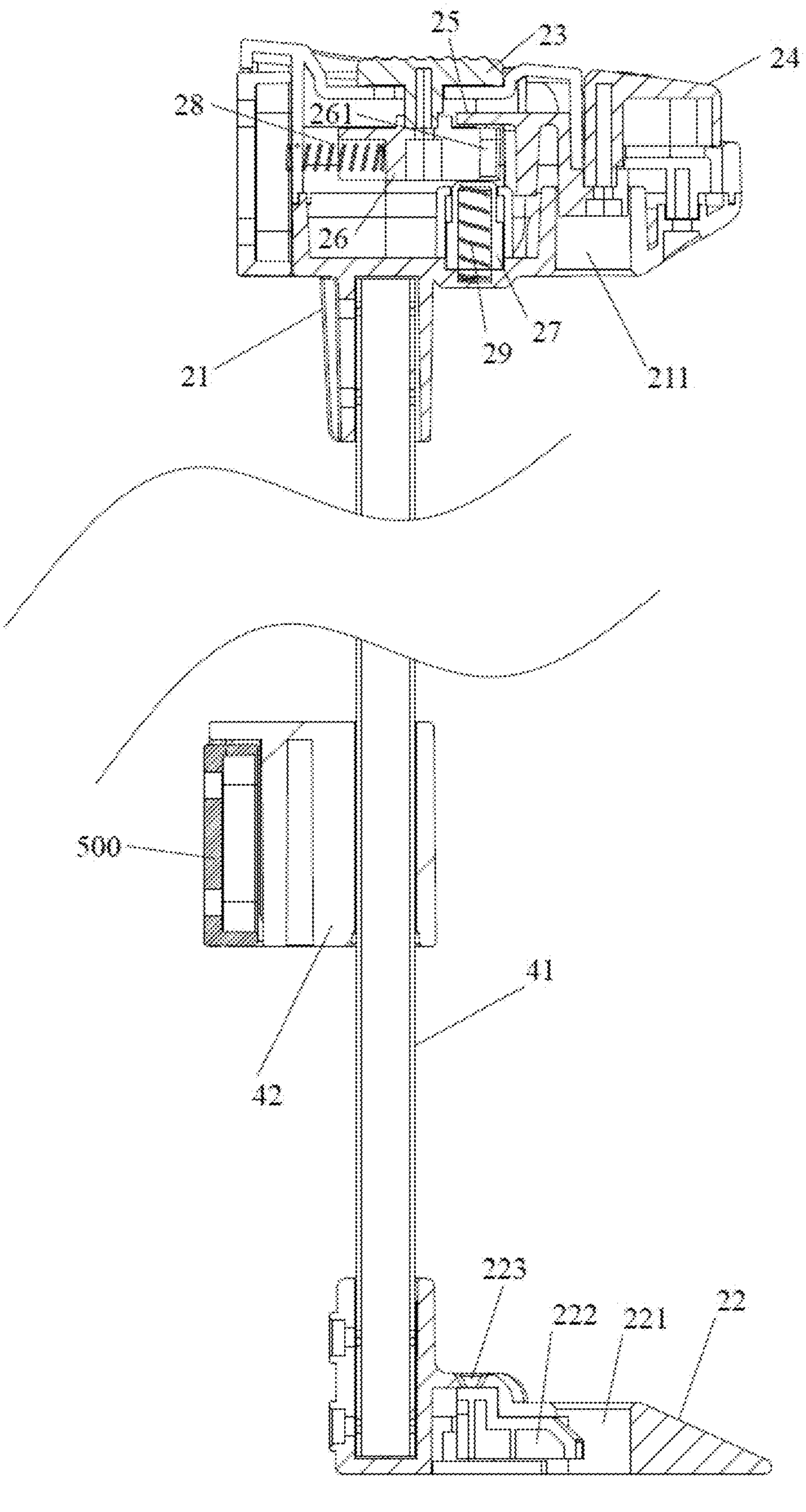
FIG. 3 is a cross-sectional view of the first connecting mechanism.
Figure 4:
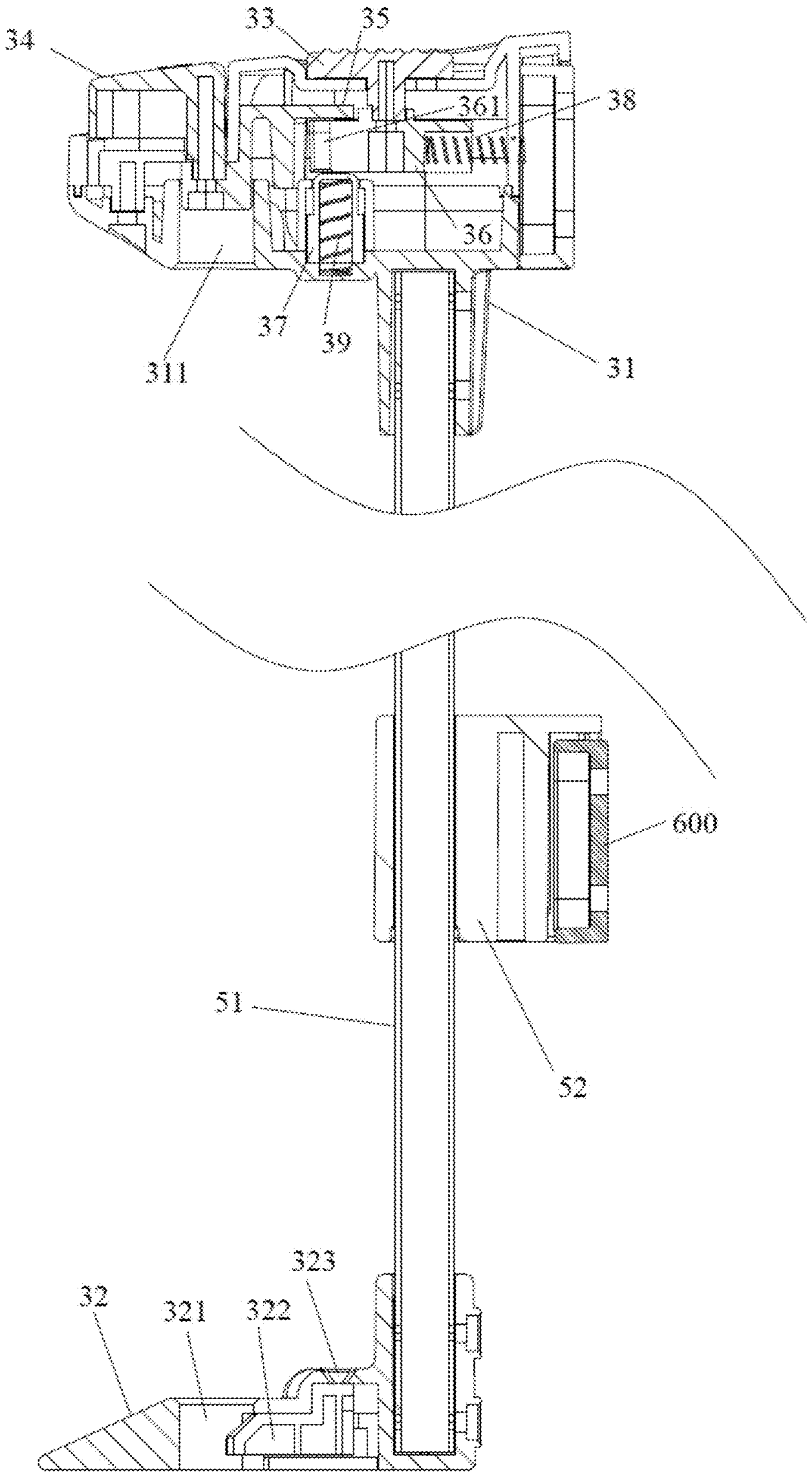
FIG. 4 is a cross-sectional view of the second connecting mechanism.
Figure 5:
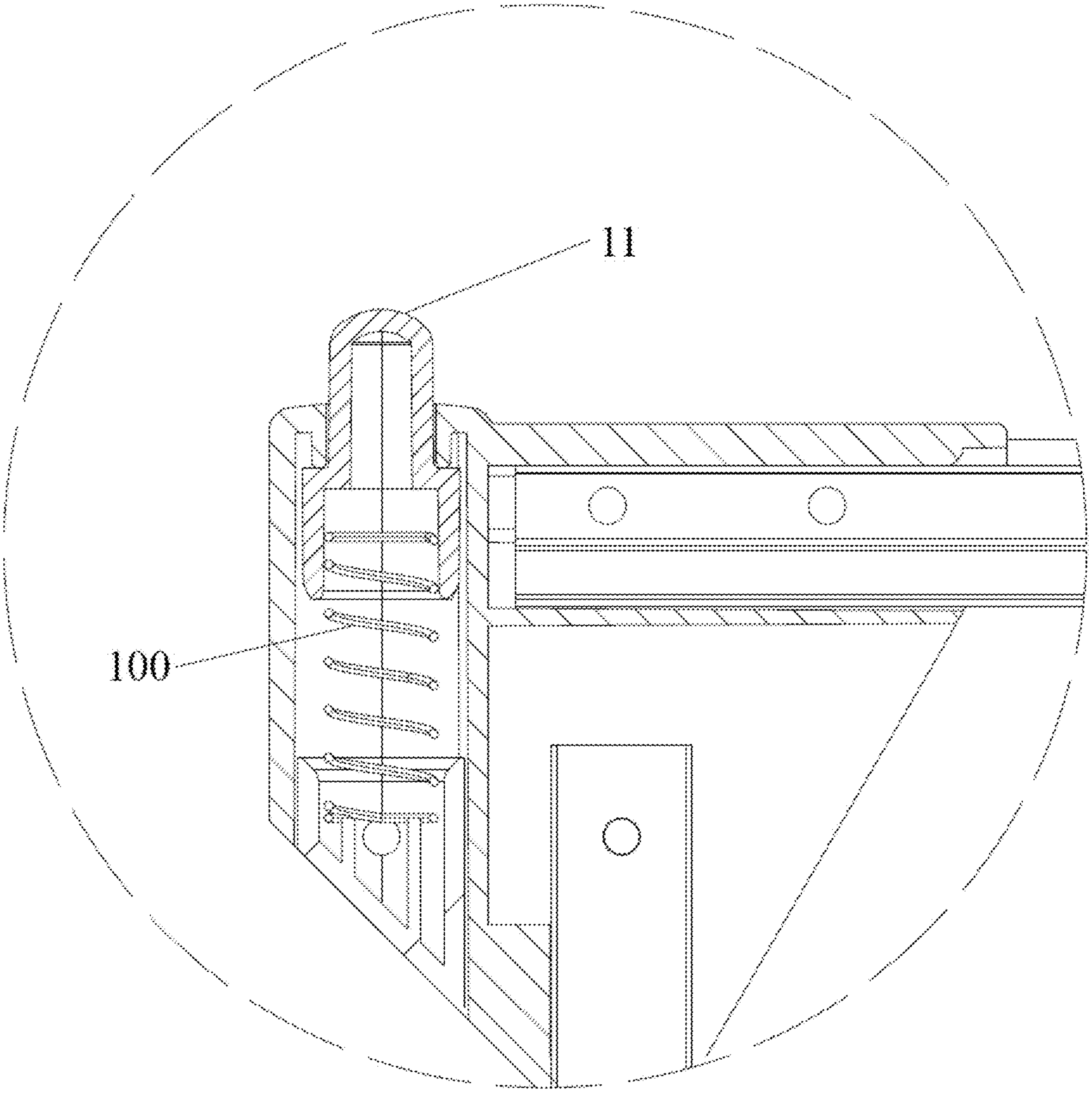
FIG. 5 is a sectional view of a fit between a first expansion member and a first top spring.
Figure 6:
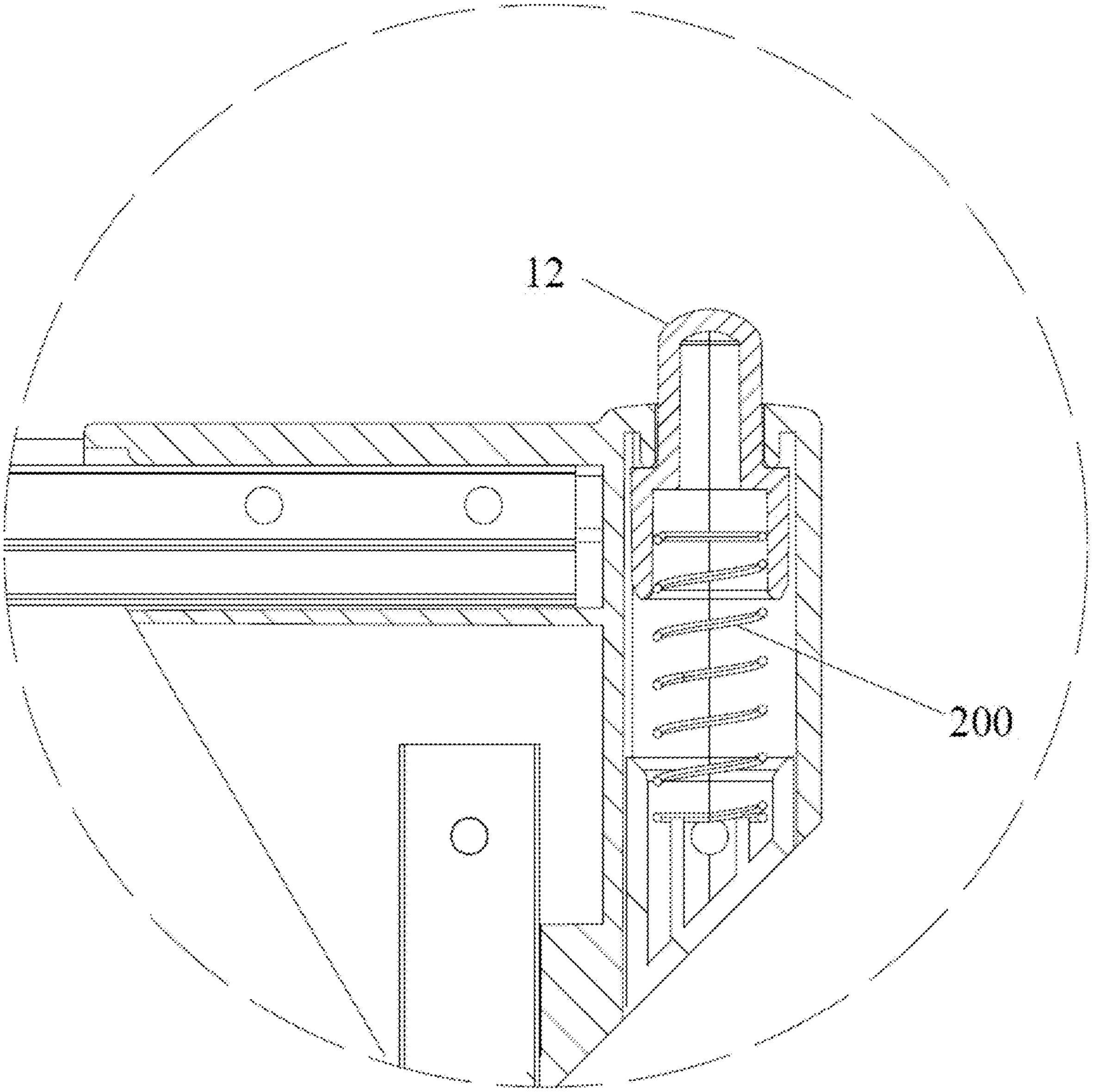
FIG. 6 is a sectional view of the fit between a second expansion member and a second top spring.
Figure 7:
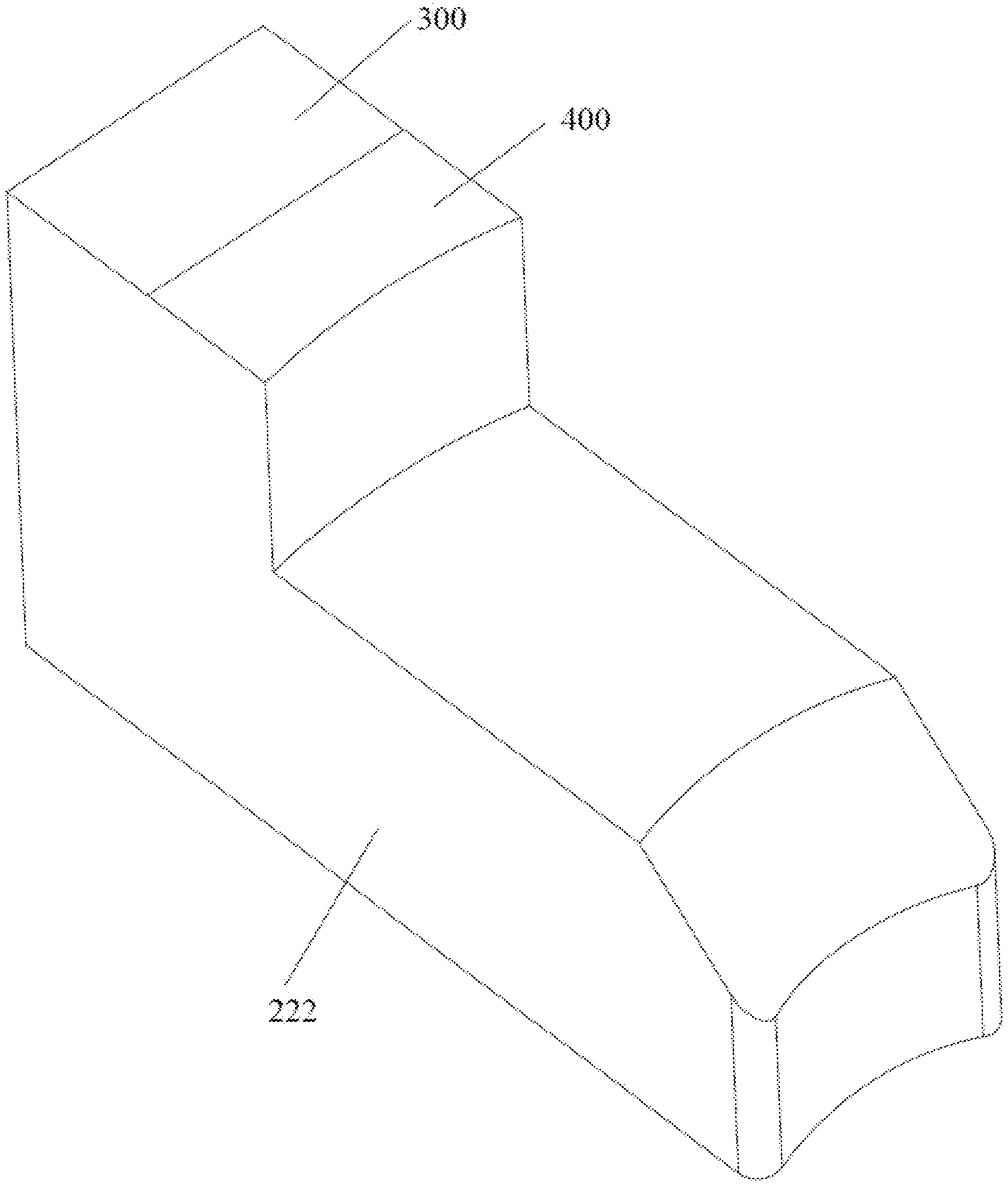
FIG. 7 is a perspective view of a first push member.

In the embodiments of the invention, as shown in FIGS. 1 to 4, a new type of sliding door railing, including a door railing body 1, a first connecting mechanism 2, and a second connecting mechanism 3, the first connecting mechanism 2 and the second connecting mechanism 3 are fixed at intervals in opposite in the installation position, one side of the door railing body 1 is detachably and pivotally connected to the first connecting mechanism 2, and the side of the door railing body 1 far away from the first connecting mechanism 2 is detachably and pivotally connected to the second connecting mechanism 3.

The present invention discloses a new type of sliding door railing and, during installation, the first connecting mechanism and the second connecting mechanism are spaced in opposite direction fat the installation position, and then the opposite sides of door railing body are detachably and pivotally connected to the first connecting mechanism and second connecting mechanism, respectively, the connection between the door railing body and the first connecting mechanism can be disconnected, and the door railing body can be forced to swing for door opening and closing, with the connection position between the door railing body and the second connecting mechanism as the rotation center; the connection between the door railing body and the second connecting mechanism can also be disconnected, and the door railing body can be forced to swing for door opening and closing, with the connection position between the door railing body and the first connecting mechanism as the rotation center. Compared with traditional methods, the new type of sliding door railing having a relatively simple structure can be quickly removed when needed, providing ideal practicality and novelty.

Specifically, the upper left end and lower left end of the door railing body are detachably and pivotally connected to the upper end and lower end of the first connecting mechanism, and the upper right end and lower right end of the door railing body are detachably and pivotally connected to the upper end and lower end of the second connecting mechanism, respectively.

In further, the first connecting mechanism 2 includes a first upper seat 21 and a first lower seat 22 that have a first push button 23, the bottom of the first upper seat 21 and the top of the first lower seat 22 are respectively provided with a first socket 211 and a second socket 221, and a first expansion member 11 is movably provided at the position where the door railing body 1 is assembled with the first upper seat 21, the first expansion member 11 can, relative to the door railing body 1, move between the position where it partially extends into the first socket 211 and the position where it exits the first socket 211, and a first top spring 100 is additionally provided to apply elastic force to cause the first expansion member 11 move in the direction in which the first expansion member 11 can partially extend into the first socket 211;

a second expansion member 12 is movably installed at the position where the first lower seat 22 is assembled with the door railing body 1, the second expansion member 12 can, relative to the door railing body 1, move between the position where it partially extends into the second socket 221 and the position where it exits the second socket 211, and a second top spring 200 is additionally provided to apply elastic force to cause the second expansion member 12 move in the direction in which the second expansion member 12 can partially extend into the second socket 221, and the door railing body can maintain detachable pivot fit with the first connecting mechanism through the cooperation between the first expansion member and the first socket, as well as the cooperation between the second expansion member and the second socket;

the first socket 211 extends to the top of the first upper seat 21 that runs through the first upper seat 21, and a first pressure piece 24 is movably installed on the upper end of the first socket 211, the first pressure piece 24 can perform vertical reciprocating motion along the first socket 211 to force the first expansion member 11 to exit the first socket 211 or move away from the first expansion member 11, the first push button 23 can move, relative to the first upper seat 21, between the position where it locks the first pressure piece 24 and the position where it unlocks the first pressure piece 24, and the top of door railing body can be disconnected from the first upper seat by pressing down on the first pressure rod and, during operation, the first push button should be first driven to unlock the first pressure rod to avoid the disassembly of the door railing body due to accidental touch;

the second connecting mechanism 3 includes a second upper seat 31 and a second lower seat 32 that have a second push button 33, the bottom of the second upper seat 31 and the top of the second lower seat 32 are respectively provided with a third socket 311 and a fourth socket 321, a third expansion member 13 is movably installed at the position where the second upper seat 31 is assembled with the door railing body 1, the third expansion member 13 can, relative to the door railing body 1, move between the position where it partially extends into the third socket 311 and the position where it exits the third socket 311, and a sixth top spring is additionally provided to apply elastic force to cause the third expansion member 13 move in the direction in which the third expansion member 12 can partially extend into the third socket 311;

a fourth expansion member 14 is movably installed at the position where the second lower seat 32 is assembled with the door railing body 1, the fourth expansion member 14 can, relative to the door railing body 1, move between the position where it partially extends into the fourth socket 321 and the position where it exits the fourth socket 321, and a seventh top spring is additionally provided to apply elastic force to cause the fourth expansion member 14 move in the direction in which the fourth expansion member 14 can partially extend into the fourth socket 321, the door railing body can maintain detachable pivot fit with the second connecting mechanism through the combination of the third expansion member and the third socket, as well as the combination of the fourth expansion member and the fourth socket;

the third socket 311 extends to the top of the second upper seat 31, and a second pressure piece 34 is movably installed on the upper end of the third socket 311, the second pressure piece 34 can perform vertical reciprocating motion along the third socket 311 to force the third expansion member 13 to exit the third socket 311 or move away from the third expansion member 13, the second push button 33 can, relative to the second upper seat 31, move between the position where it locks the second pressure piece 34 and the position where it unlocks the second pressure piece 34, and the top of door railing body can be disconnected from the second upper seat by pressing down on the second pressure rod and, during operation, the second push button should be first driven to unlock the first pressure rod to avoid the disassembly of the door railing body due to accidental touch.

Specifically, a first upper seat 21 is internally provided with a first follow-up portion 25 that can move with the first pressure piece 24, the first upper seat is internally and movably provided with a first slider 26 that is connected to the first push button 23, and a first strip groove 261 that runs through the top and bottom walls of the first slider 26 is provided on the side near the first pressure piece 24, the first slider 26 can move between the position where the first follow-up portion 25 aligns with the upper opening of the first strip groove 261 and the position where the first follow-up portion 25 is away from the upper opening of the first strip groove 261, a first top piece 27 is movably provided inside the first upper seat 21 at a position below the first slider 26, and when the first follow-up portion 25 aligns with the opening at the upper end of the first strip groove 261, the first top piece 27 can move between the position where it partially extends into the first strip groove 261 and the position where it exits the first strip groove 261, and a third top spring 28 is additionally provided to apply elastic force to cause the first slider 26 move in the direction in which the first follow-up portion 25 is away from the upper opening of the first strip groove 261, and a fourth top spring 29 is additionally provided to apply elastic force to cause the first top piece 27 move in the direction in which the first top piece 27 can partially extend into the first strip groove 261; the first top piece 27 maintains elastic contact with the bottom wall of the first slider 26 through the elastic force applied by the fourth top spring 29 and, when the first slider 26 moves to the position where the first follow-up portion 25 aligns with the upper opening of the first strip groove 261, the elastic force applied by the fourth top spring 29 can force the upper end of the first top piece 27 to extend into the first strip groove 261 to fix the first slider 26. When the first pressure piece 24 moves to a position where the first expansion member 11 is forced to exit the first socket 211, the first follower portion 25 moves to force the first top piece 27 to exit the first strip groove 261 to unlock the first slider 26 and, after the first slider 26 is unlocked, the third spring forces the first slider 26 to move in the direction close to the first pressure piece 24, so that the first top piece is staggered from the first strip groove 261 and maintains elastic contact with the bottom wall of the first slider 26, and the first follow-up portion 25 maintains elastic contact with the first strip groove 261 and, when the first pressure piece 24 goes up (for example, lifting the first pressure piece 24 by external force or during installation, pushing the first pressure piece 24 upward by the first expansion member 11), the first follow-up portion 25 is driven to exit the first strip groove 261, so that the first slider 26 can move towards the direction where the upper opening of the first strip groove 261 is staggered from the first follow-up portion 25, and the first pressure piece 24 can be locked.

Specifically, a first push member 222 is movably provided inside the first lower seat 22, first push member 222 can move between the position where it partially extends into the second socket 221 and the position where it exits the second socket 221, and a fifth top spring is additionally provided to apply elastic force to cause the first push member 222 move in the direction in which the first push member 222 partially, an inclined plane, extends into the second socket 221, and when the second expansion member 12 extends into the second socket 221, the inclined plane can force the portion that has been inserted into the second socket 221 to exit.

Specifically, the top of the first push member 222 is provided with a first mark 300 and a second mark 400, and the top of the first lower seat 22 is provided with a first window 223 and, after the first push member 222 partially extends into the second socket 221, the first mark 300 is aligned up and down with the first window 223 and, after the first push member 222 partially exits the second socket 221, the second mark 400 is aligned up and down with the first window 223. In this embodiment, the first mark 300 indicates that the second expansion member 12 is not inserted into the second socket 221, and the second mark 400 indicates that the second expansion member 12 has been inserted into the second socket 221, ensuring that the door railing body 1 is assembled with the first lower seat 22.

Specifically, a first support rod 41 is provided, and the two ends of the first support rod 41 are respectively connected with the first upper seat 21 and the first lower seat 22, the first support rod 41 is movably provided with a first moving seat 42, and the side of the first moving seat 42 away from the first door body is provided with a first plug board 500 that can be inserted into or withdrawn from the first moving seat 42, the first plug board 500 is fixed in the installation position, and the first support rod 41 can be fixed in the installation position through the connection between the first moving seat 42 and the first plug board 500, suitable for the installation position with a skirting line.

Specifically, the first upper seat 21 is detachably fixed in the installation position through the first quick release mechanism, and reference can also be made to prior art for the first quick release mechanism, which will not be further elaborated here.

Specifically, the second upper seat 31 is internally provided with a second follow-up portion that can move with the second pressure piece 34, a second slider 36 that is connected to the second push button 33 is movably provided inside the second upper seat 31, and a second strip groove that runs through the top and bottom walls of the second slider 36 is provided on one side of the second slider 34 near the second pressure piece 34, the second slider 36 can move between the position where the second follow-up portion is aligned with the upper opening of the second strip groove and the position where the second follow-up portion is away from the upper opening of the second strip groove, and a second top piece 37 is movably provided inside the second upper seat 31 corresponding to the position below the second slider 36, and when the second follow-up portion aligns with the upper opening of the second strip groove, the second top member 37 can move between the position where it partially extends into the second strip groove and the position where it exits the second strip groove, an eighth top spring 38 is additionally provided to apply elastic force to cause the second slider 36 move in the direction in which the second follow-up portion is away from the upper opening of the second strip groove, and a ninth top spring 39 is also provided to apply elastic force to cause the second top piece 37 move in the direction in which it partially extends into the second strip groove. The second top piece 37 maintains elastic contact with the bottom wall of the second slider 36 through the elastic force applied by the ninth top spring 39 and, when the second slider 36 moves to the position where the second follow-up portion aligns with the upper opening of the second strip groove, the elastic force applied by the ninth top spring 39 can force the upper end of the second top piece 37 to extend into the second strip groove to fix the second slider 36. When the second pressure piece 34 moves to a position where the second expansion member 12 is forced to exit the third socket 311, the second follower portion moves to force the second top piece 37 to exit the second strip groove to unlock the second slider 36 and, after the second slider 36 is unlocked, the eighth spring 38 forces the second slider 36 to move in the direction close to the second pressure piece 34, so that the second top spring 200 is staggered from the first strip groove and maintains elastic contact with the bottom wall of the second slider 36, and the second follow-up portion maintains elastic contact with the second strip groove and, when the second pressure piece 34 goes up (for example, lifting the second pressure piece 34 by external force or during installation, pushing the second pressure piece 34 upward by the second expansion member 12), the second follow-up portion is driven to exit the second strip groove, so that the second slider 36 can move towards the direction where the upper opening of the second strip groove is staggered from the second follow-up portion, and the second pressure piece 34 can be locked.

Specifically, a second push member 322 is movably provided inside the second lower seat 32, and the second push member 322 can move between the position where it partially extends into the fourth socket 321 and the position where it exits the fourth socket 321, and additionally a tenth top spring is provided to apply elastic force to cause the second push member 322 move in the direction where it partially, an inclined plane, extends into the fourth socket 321, and when the fourth expansion member 14 extends into the fourth socket 321, the inclined plane can force the portion that has been inserted into the fourth socket 321 to exit.

Specifically, the top of the second push member 322 is provided with a third mark (not shown in the figure) and a fourth mark (not shown in the figure), and the top of the second lower seat 32 is provided with a second window and, after the second push member 322 partially extends into the fourth socket 321, the third mark is aligned up and down with the second window and, after the second push member 322 partially exits the fourth socket 321, the fourth mark is aligned up and down with the second window. In this embodiment, the third mark indicates that the fourth expansion member 14 is not inserted into the fourth socket 321, and the fourth mark indicates that the fourth expansion member 14 has been inserted into the fourth socket 321, ensuring that the door railing body 1 is assembled with the second lower seat 32.

Specifically, a second support rod 51 is provided, and the two ends of the second support rod 51 are respectively connected with the second upper seat 31 and the second lower seat 32, the second support rod 51 is movably provided with a second moving seat 52, and the side of the second moving seat 52 away from the second door body is provided with a second plug board 600 that can be inserted into or withdrawn from the second moving seat 52, the second plug board 600 is fixed in the installation position, and the second support rod 51 can be fixed in the installation position through the connection between the second moving seat 52 and the second plug board 600, suitable for the installation position with a skirting line.

Specifically, the second upper seat 31 is detachably fixed in the installation position through the second quick release mechanism, and reference can also be made to prior art for the second quick release mechanism, which will not be further elaborated here.

Specifically, the door body is an integrated structure, or the door railing body 1 includes a first door body and a second door body, the top and bottom of the first door body, as well as the top and bottom of the second door body, are fixedly connected to a-first bar members 15 and a second bar member 16, respectively, the two ends of the first bar members 15 are bent and extended to cover partial back wall of the first door body and partial front wall of the second door body, and the two ends of the second bar member 16 are bent and extended to respectively cover partial back wall of the first door body and partial front wall of the second door body, and the second door body can, relative to the first door body, move between the position where the first bar members 15 are in contact with each other and the position where the first bar members 15 are away from each other, and the two bent and extending ends of the first strip-bar members 15 and of the second bar member 16 can prevent the disconnection between the first and second door bodies;

one side of the first door body is detachably and pivotally connected to the first connecting mechanism 2, and the side of the second door railing away from the first door body is detachably and pivotally connected to the second connecting mechanism 3, and the connection between the first door body and the first connecting mechanism 2 can be disconnected, and the door railing can swing and slide to restore the access, with the connection position between the second door body and the second connecting mechanism 3 as the rotation center; the connection between the second door body and the second connecting mechanism 3 can also be disconnected, and the door railing can swing and slide to restore the access, with the connection position between the first door body and the first connecting mechanism 2 as the rotation center.

Specifically, the first and second door bodies are integrated structures or foldable structures, and reference can also be made to prior art for the first quick release mechanism, which will not be further elaborated here.

Specifically, the bottom of the first door body and/or second door body is provided with one or more universal balls (not shown in the figure) for rolling contact with the ground.

The above are only the preferred embodiments of the present invention, and are not intended to limit the present invention. Any equivalent structural transformation made based on the description and accompanying drawings hereof under the concept of present invention, or be directly/indirectly applied in other related technical fields, should fall within scope of patent protection of the present invention.

What is claimed is:

1. A sliding door railing, including a door railing body, a first connecting mechanism, and a second connecting mechanism, the first connecting mechanism and the second connecting mechanism are fixed at intervals in opposite in an installation position, one side of the door railing body is detachably and pivotally connected to the first connecting mechanism, and one side of the door railing body far away from the first connecting mechanism is detachably and pivotally connected to the second connecting mechanism;

wherein an upper left end and a lower left end of the door railing body are detachably and pivotally connected to an upper end and a lower end of the first connecting mechanism, and an upper right end and a lower right end of the door railing body are detachably and pivotally connected to an upper end and a lower end of the second connecting mechanism, respectively;

wherein the first connecting mechanism comprises a first upper seat and a first lower seat that have a first push button, a bottom of the first upper seat and a top of the first lower seat are respectively provided with a first socket and a second socket; and a first expansion member is movably provided at a position where the door railing body is assembled with the first upper seat, the first expansion member can, relative to the door railing body, move between a position where it partially extends into the first socket and a position where it exits the first socket, and a first top spring is further provided to apply elastic force to cause the first expansion member move in a direction in which the first expansion member can partially extend into the first socket;

a second expansion member is movably installed at a position where the first lower seat is assembled with the door railing body, the second expansion member can, relative to the door railing body, move between a position where it partially extends into the second socket and a position where it exits the second socket, and a second top spring is further provided to apply elastic force to cause the second expansion member move in a direction in which the second expansion member can partially extend into the second socket;

the first socket extends to a top of the first upper seat that runs through the first upper seat, and a first pressure piece is movably installed on an upper end of the first socket, the first pressure piece can perform vertical reciprocating motion along the first socket to force the first expansion member to exit the first socket or move away from the first expansion member, the first push button can move, relative to the first upper seat, between a position where it locks the first pressure piece and a position where it unlocks the first pressure piece;

the second connecting mechanism includes a second upper seat and a second lower seat that have a second push button, a bottom of the second upper seat and a top of the second lower seat are respectively provided with a third socket and a fourth socket, a third expansion member is movably installed at a position where the second upper seat is assembled with the door railing body, the third expansion member can, relative to the door railing body, move between a position where it partially extends into the third socket and a position where it exits the third socket, and a sixth top spring is further provided to apply elastic force to cause the third expansion member move in a direction in which the third expansion member can partially extend into the third socket;

a fourth expansion member is movably installed at a position where the second lower seat is assembled with the door railing body, the fourth expansion member can, relative to the door railing body, move between a position where it partially extends into the fourth socket and a position where it exits the fourth socket, and a seventh top spring is further provided to apply elastic force to cause the fourth expansion member move in a direction in which the fourth expansion member can partially extend into the fourth socket;

the third socket extends to a top of the second upper seat, and a second pressure piece is movably installed on an upper end of the third socket, the second pressure piece can perform vertical reciprocating motion along the third socket to force the third expansion member to exit the third socket or move away from the third expansion member, the second push button can, relative to the second upper seat, move between a position where it locks the second pressure piece and a position where it unlocks the second pressure piece.

2. The sliding door railing according to claim 1, wherein a first upper seat is internally provided with a first follow-up portion that can move with the first pressure piece, the first upper seat is internally and movably provided with a first slider that is connected to the first push button, and a first strip groove that runs through top and bottom walls of the first slider is provided on one side near the first pressure piece, the first slider can move between a position where the first follow-up portion aligns with an upper opening of the first strip groove and a position where the first follow-up portion is away from the upper opening of the first strip groove, a first top piece is movably provided inside the first upper seat at a position below the first slider, and when the first follow-up portion aligns with the upper opening of the first strip groove, the first top piece can move between a position where it partially extends into the first strip groove and a position where it exits the first strip groove, and a third top spring is further provided to apply elastic force to cause the first slider move in a direction in which the first follow-up portion is away from the upper opening of the first strip groove, and a fourth top spring is further provided to apply elastic force to cause the first top piece move in a direction in which the first top piece can partially extend into the first strip groove.

3. The sliding door railing according to claim 1, wherein a first push member is movably provided inside the first lower seat, and the first push member can move between a position where it partially extends into the second socket and a position where it exits the second socket, and a fifth top spring is further provided to apply elastic force to cause the first push member move in a direction in which the first push member partially, an inclined plane, extends into the second socket, and when the second expansion member extends into the second socket, the inclined plane can force a portion that has been inserted into the second socket to exit.

4. The sliding door railing according to claim 3, wherein a top of the first push member is provided with a first mark and a second mark, and the top of the first lower seat is provided with a first window and, after the first push member partially extends into the second socket, the first mark is aligned up and down with the first window and, after the first push member partially exits the second socket, the second mark is aligned up and down with the first window.

5. The sliding door railing according to claim 1, wherein a first support rod is provided, and two ends of the first support rod are respectively connected with the first upper seat and the first lower seat, the first support rod is movably provided with a first moving seat, and one side of the first moving seat away from a first door body is provided with a first plug board that can be inserted into or withdrawn from the first moving seat, the first plug board is fixed in the installation position, and the first support rod can be fixed in the installation position through a connection between the first moving seat and the first plug board.

6. The sliding door railing according to claim 1, wherein the second upper seat is internally provided with a second follow-up portion that can move with the second pressure piece, a second slider that is connected to the second push button is movably provided inside the second upper seat, and a second strip groove that runs through top and bottom walls of the second slider is provided on one side of the second slider near the second pressure piece, the second slider can move between a position where the second follow-up portion is aligned with an upper opening of the second strip groove and a position where the second follow-up portion is away from the upper opening of the second strip groove, and a second top piece is movably provided inside the second upper seat corresponding to a position below the second slider, and when the second follow-up portion aligns with the upper opening of the second strip groove, the second top member can move between a position where it partially extends into the second strip groove and a position where it exits the second strip groove, an eighth top spring is further provided to apply elastic force to cause the second slider move in a direction in which the second follow-up portion is away from the upper opening of the second strip groove, and a ninth top spring is also provided to apply elastic force to cause the second top piece move in a direction in which it partially extends into the second strip groove.

7. The sliding door railing according to claim 1, wherein a second push member is movably provided inside the second lower seat, and the second push member can move between a position where it partially extends into the fourth socket and a position where it exits the fourth socket, and additionally a tenth top spring is provided to apply elastic force to cause the second push member move in a direction where it partially, an inclined plane, extends into the fourth socket, and when the fourth expansion member extends into the fourth socket, the inclined plane can force the portion that has been inserted into the fourth socket to exit.

8. The sliding door railing according to claim 7, wherein a top of the second push member is provided with a third mark and a fourth mark, and the top of the second lower seat is provided with a second window and, after the second push member partially extends into the fourth socket, the third mark is aligned up and down with the second window and, after the second push member partially exits the fourth socket, the fourth mark is aligned up and down with the second window.

9. The sliding door railing according to claim 1, a second support rod is provided, and two ends of the second support rod are respectively connected with the second upper seat and the second lower seat, the second support rod is movably provided with a second moving seat, and one side of the second moving seat away from the second door body is provided with a second plug board that can be inserted into or withdrawn from the second moving seat, the second plug board is fixed in the installation position, and the second support rod can be fixed in the installation position through a connection between the second moving seat and the second plug board.

10. The sliding door railing according to claim 1, wherein the door railing body includes a first door body and a second door body, a top and a bottom of the first door body, as well as a top and a bottom of the second door body, are fixedly connected to first bar members and a second bar member, respectively, two ends of the first bar members are bent and extended to cover partial back wall of the first door body and partial front wall of the second door body, and two ends of the second bar member are bent and extended to respectively cover partial back wall of the first door body and partial front wall of the second door body, and the second door body can, relative to the first door body, move between a position where the first bar members are in contact with each other and a position where the first bar members are away from each other;

one side of the first door body is detachably and pivotally connected to the first connecting mechanism, and one side of the second door body away from the first door body is detachably and pivotally connected to the second connecting mechanism.

11. The sliding door railing according to claim 10, wherein the bottom of the first door body and/or second door body is provided with one or more universal balls for rolling contact with the ground.

* * * * *